Dec. 22, 1942.  G. O. JOHNSON  2,306,167
PUNCH PRESS CONTROL
Filed March 14, 1942
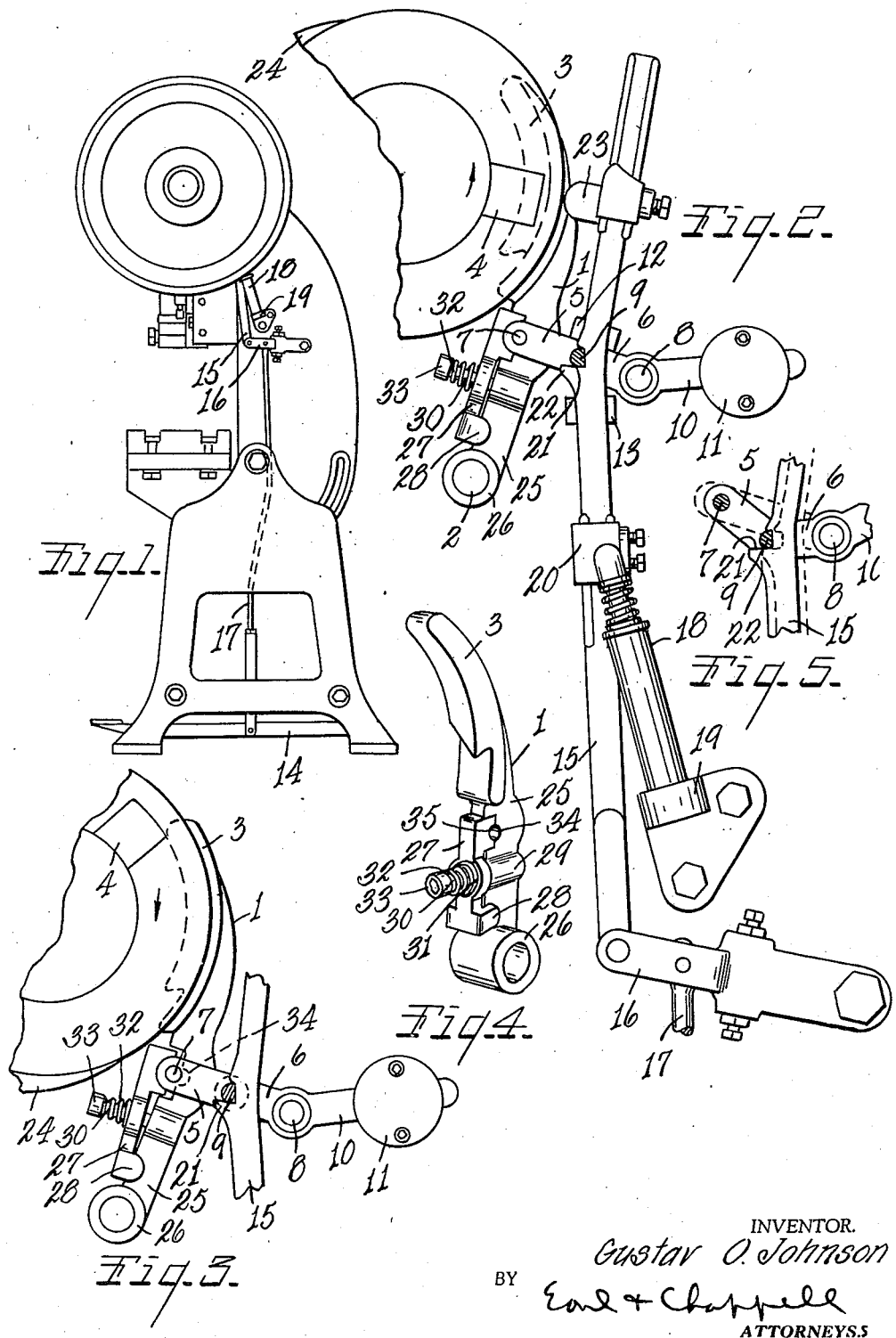
INVENTOR.
Gustav O. Johnson
BY Earl & Chappell
ATTORNEYS Patented Dec. 22, 1942

2,306,167

UNITED STATES PATENT OFFICE 2,306,167

PUNCH PRESS CONTROL

Gustav O. Johnson, Elkhart, Ind., assignor to Johnson Machine & Press Corporation Application March 14, 1942, Serial No. 434,697

6 Claims. (Cl. 192—25)

This invention relates to improvements in punch press controls.

The main objects of this invention are:

First, to provide an improved single revolution or non-repeat control for a treadle operated power press which is operative to unfailingly halt the press ram at the conclusion of each operating cycle, including means for preventing damage to the parts and for maintaining the same in operative clutch disengaging position during the period of inoperation of the press.

Second, to provide a toggle-type control of the foregoing character including a novel clutch bolt disengaging arm and shoe carried thereby, which arm is a two-part construction rendering the same resilient and yieldable in its action for the purpose of preventing damage to the control parts under certain circumstances.

Further objects relating to details and economies of my invention will appear from the description to follow. The invention is defined in the claims.

A structure embodying the features of my invention is illustrated in the accompanying drawing, wherein:

Fig. 1 is a view in side elevation conventionally illustrating an inclinable power press of the type to which the present control is applied.

Fig. 2 is an enlarged fragmentary view in side elevation, illustrating the main parts of the single revolution control and in particular the structural details of the present improvements in said control, the parts being shown in operative clutch bolt disengaging position.

Fig. 3 is a fragmentary view generally similar to Fig. 2, illustrating the parts in another position thereof in which the yieldable arm functions to prevent damage to the control and to maintain certain portions of the control in their operative clutch disengaging position.

Fig. 4 is a perspective view illustrating the control shoe carrying arm and the two-part yieldable construction thereof adapting the same for the foregoing purposes, and Fig. 5 is a diagrammatical view illustrating alternative positions of the toggle type clutch shoe applying device incorporated in the control.

In my Patent No. 2,178,205 of October 31, 1939, I illustrate and describe an improved single revolution toggle-type control for a conventional power punch press which is very effective in unfailingly disengaging or retracting the usual clutch bolt on the ram shaft or collar from the press fly wheel at the conclusion of the upstroke of the ram following a press operation. The present invention relates to further improvements in a control of this type. The details of the said control and its operation are fully described in my patent referred to above, but for the purpose of completeness and clarity it is pointed out that the control includes an arm, generally designated 1, pivoted to the press frame at 2 at the lower end thereof and provided at its opposite end with a cam-like shoe 3 of known form adapted to have camming engagement with the laterally slidable bolt 4 carried by the press shaft at the conclusion of a cycle of operation of said shaft, to thereby urge the said bolt laterally to an inoperative position out of engagement with the fly wheel. A clutch bolt and declutching shoe arrangement of this general type is well known in the art, hence I have not illustrated the same in detail, since those skilled in the art will be familiar with the structure and operation thereof.

Arm 1 is normally urged in counterclockwise direction to operative declutching position by means of a toggle arrangement including a pair of links 5, 6, the former of which has a pivotal connection (to be hereinafter more fully described) by means of a pin 7 to the arm 1 medially of its length, and the latter of which has a fixed pivotal connection to the press frame at 8. The toggle links 5, 6 are pivotally connected at the adjacent ends thereof by a pin 9 and the link 6 has a rearward extension 10 on which a counterweight 11 is adjustably mounted. Stops 12, 13 on the machine frame limit the movement of the toggle from operative straightened position, illustrated in Fig. 2 and in dotted lines in Fig. 5, to the inoperative position illustrated in solid lines in Fig. 5.

The toggle constituted by arms 5, 6 is adapted to be broken upon actuation of the treadle 14 of the press, through a control link or rod 15 which is pivoted at its lower end to one end of a lever 16, the latter being in turn pivoted at its opposite end to the press frame. This lever includes an adjusting feature for initially setting the lever to properly trip the press, which does not constitute a part of the present invention. A vertical tension rod 17 connects trip lever 16 to the treadle, the connection of the parts being such that downward treadle-actuation of rod 17 tends to urge the link 15 to the left as viewed in Fig. 2. This tendency is further contributed to by a thrust spring device generally designated 18 which abuts a fixed bracket 19 on the frame at one end and at the other end bears against an adjustable abutment 20 secured to the link to urge the later upwardly for engagement with the toggle. The details of this spring thrust device are fully illustrated and described in my patent identified above.

The spring device tends to urge the link in a counterclockwise direction about its pivot to lever 16 while actuating link 15 into engagement with the medial pivot pin 9 of the toggle. At said pivot pin 9 the link is provided with a notch or recess 21 on the left-hand side thereof including a lower lip 22 which projects substantially beneath the pin and insures effective engagement with the latter on the spring urged upstroke of the link. At the same time the engagement of the pin in the notch is sufficient to enable the pin to be drawn downwardly when the link is treadle-actuated downwardly, to thereby break the toggle at pin 9 and withdraw the arm 1 laterally to the right or in counterclockwise direction about its pivot, thereby withdrawing shoe 3 from operative press declutching engagement with the bolt 4. When this happens the press ram commences its down stroke.

In order to reset the control parts in operative position so as to declutch the press at the termination of an operating cycle, link 15 is provided adjacent its upper end with an adjustable reset follower 23 which is engageable by reset cam 24 on the press shaft to swing link 15 outwardly, thereby disengaging toggle pin 9 from the control link and enabling the counterweight 11 to straighten the toggle and urge arm 1 inwardly or in counterclockwise direction to operative position. This action takes place regardless of whether or not the operator has released the treadle.

The above described structure constitutes the subject matter of the above patent. The present invention relates solely to improvements in this structure in order to forestall damage to the parts under certain conditions and to maintain the toggle in its operative straight condition during adjustments which it may be desired to make with the press in declutched condition.

Said improvements consist in forming the shoe carrying arm 1 of two-part construction, as illustrated in Figs. 2, 3 and 4, including a main body member 25, which carries the pivot boss 26 by which the member is pivoted to a frame and the shoe 3. The second part of the arm is constituted by a relatively small member 27 formed at one end thereof with a rounded pivot area receivable in a correspondingly shaped pivot recess in member 25 immediately above the boss 26 of the latter. At either side of this area the member 27 has wings 28 extending on opposite sides of the main arm member 25 to maintain the members in lateral alinement.

The member 25 is provided with a transverse boss or enlargement 29 which is drilled and threaded for the adjustable reception of a threaded pin or stud 30 extending transversely of the arm and freely receivable in an aligned recess 31 in the member 27. A conical coil compression spring surrounds the stud, which latter has a set screw type head 33 enabling the stud to be threadedly adjusted in member 25 to thereby regulate the force exerted by spring 22. Accordingly, spring 32 urges the pivotal engaging members 25 and 27 toward one another. These members are provided adjacent the free end of the member 27 with coacting semicircular seats 34, 35, the radius of which is approximately equal to the radius of the pin 7, which is pivotally received therein. This provides a very simple method of journaling the end of said toggle pin and the pin is maintained in effective engagement with one or the other of said seats, either by the lateral force exerted on the pin when the toggle is positively broken by link 15 or by the opposite lateral force exerted by counterweight 11 when the toggle is again straightened.

The purpose of the yieldable construction of arm 1 is to insure that no damage to the parts, either the arm itself, the clutch bolt 4, or the toggle members, will occur in the event the press shaft is actuated in the reverse direction, as indicated by the arrow in Fig. 3, it being understood that the direction of rotation of said shaft in its operating cycle is counterclockwise, as indicated by the arrow in Fig. 2. Thus, should the bolt be forced into engagement with the shoe 3 in reversely adjusting or manipulating the press, arm member 25 merely yields rearwardly or in clockwise direction as viewed in Fig. 3 relative to the arm member 27, the latter being maintained in fixed position by the straight toggle linkage. This prevents any damage to any of the parts involved and likewise insures that the said toggle will remain straight and unbroken, though in position to be instantaneously broken when the treadle is actuated.

An embodiment of the invention which incorporates the principles of the invention in a highly desirable manner has been illustrated and described, though I am aware that other embodiments within the intent of the invention will suggest themselves to those skilled in the art. It should be understood that the foregoing terminology is used only descriptively rather than in a limiting sense, and with full intention to include equivalents of the features shown and described, within the scope of the following claims.

Having thus described my invention, what I claim as new and desire to secure by Letters Patent is:

1. In a single revolution non-repeat control for a power press of the type having a clutch bolt operatively engageable with and disengageable from a fly wheel to drivingly clutch and declutch the press ram, in combination, a bolt engaging arm pivoted on the frame of the press at one end thereof and having a shoe engageable with the bolt in the rotation thereof to actuate the same to declutching position, a toggle having one link pivoted on said arm and another link pivoted on the press frame, said links being pivotally connected to one another and having means connected thereto for urging the toggle to an operative straight condition, and manually operated means for breaking said toggle to thereby retract said arm and withdraw the shoe from operative engagement with the bolt, said arm comprising a main shoe carrying arm member pivoted to the press frame, an auxiliary member pivotally engageable with said arm member, and spring means for urging said members toward one another, said members being provided with coacting curved separable seats and said first named link having a pin pivotally receivable between said seats to effect said pivotal mounting of the link to the arm, said pin being effective to retract said arm member when said toggle is broken, said main arm member being swingable outwardly relative to the auxiliary member under certain conditions to prevent damage to the control parts while maintaining the pivotal engagement of said pin with the arm and said toggle in operative straight condition.

2. In a single revolution non-repeat control for a power press of the type having a clutch bolt operatively engageable with and disengageable from a fly wheel to drivingly clutch and declutch the press ram, in combination, a bolt engaging arm pivoted on the frame of the press at one end thereof and having a shoe engageable with the bolt in the rotation thereof to actuate the same to declutching position, and manually operated means to retract said arm and withdraw the shoe from operative engagement with the bolt, said arm comprising a main shoe carrying arm member pivoted to the press frame, an auxiliary member pivotally engageable with said arm member, and spring means for urging said members toward one another, said members being provided with coacting curved separable seats and said manually operated means including a pin pivotally receivable between said seats, said pin being effective to retract said arm member when said manually actuated means is actuated, said main arm member being swingable outwardly relative to the auxiliary member under certain conditions to prevent damage to the control parts while maintaining the pivotal engagement of said pin with the arm.

3. In a single revolution non-repeat control for a power press of the type having a clutch bolt operatively engageable with and disengageable from a fly wheel to drivingly clutch and declutch the press ram, in combination a bolt engaging arm pivoted on the frame of the press and engageable with the bolt in the rotation thereof, comprising a main arm member pivoted to the press frame and provided with a bolt control shoe, an auxiliary member pivotally engageable with the main arm member and spring means for urging said members toward one another, said members being provided with coacting curved separable seats therebetween, said main arm member being swingable outwardly relative to the auxiliary member in certain conditions to prevent damage to the control parts, a toggle having a movable link pivoted between said seats, and manually operated means for breaking said toggle to thereby retract said arm and withdraw the same from operative engagement with the bolt, the toggle link retractingly engaging said main arm member for this purpose.

4. In a single revolution non-repeat control for a power press of the type having a clutch bolt operatively engageable with and disengageable from a fly wheel to drivingly clutch and declutch the press ram, in combination a bolt engaging arm pivoted on the frame of the press and engageable with the bolt in the rotation thereof, comprising a main arm member pivoted to the press frame and provided with a bolt control shoe, an auxiliary member pivotally engageable with the main arm member and spring means for urging said members toward one another, said members being provided with coacting separable seats said main arm member being swingable outwardly relative to the auxiliary member in certain conditions to prevent damage to the control parts, a toggle having a movable link pivoted between said seats, and manually operated means for breaking said toggle to thereby retract said arm and withdraw the same from operative engagement with the bolt, the toggle link retractingly engaging said main arm member for this purpose.

5. A controlling and operating member for a toggle actuated non-repeat power press control, comprising an arm adapted to be pivotally mounted at one end to the frame of the press and provided at the other end with a bolt control member adapted to control the clutch bolt of the press, said arm having an auxiliary element yieldably pivoted thereto between the ends of the arm enabling lateral separating movement of the arm and element, said element and arm being provided with separable coacting opposed curved journal surface at a point spaced from the pivotal connection of the arm and element adapted to pivotally receive a movable end pivot of an actuating member whereby said arm is enabled to pivot relative to said element under certain conditions, thereby avoiding danger of damaging the parts of the control under said conditions.

6. A controlling and operating device for a non-repeat power press control, comprising an arm adapted to be pivotally mounted at one end to the frame of the press and provided at the other end with a bolt actuating member, said arm having an auxiliary element yieldably pivoted thereto between its ends, enabling lateral separating movement of the arm and element, said element and arm being provided with coacting opposed curved journal surfaces at a point spaced from the pivotal connection of the arm and element, and a manually actuable means including an actuating element for said arm provided with means pivotally receivable between said journal surfaces, said arm pivoting relative to said element under certain conditions without distorting the relationship of said last named means to the element, and avoiding the danger of damaging the parts of the control under said conditions.

GUSTAV O. JOHNSON.